United States Patent [19]
Gold

[11] 3,789,663
[45] Feb. 5, 1974

[54] APPARATUS FOR MEASURING THE FLOW VELOCITY OF FLUID WITHIN A CONDUIT

[76] Inventor: Stephen J. Gold, 148 Fernhill Ave., Lafayette, La. 70501

[22] Filed: May 11, 1972

[21] Appl. No.: 252,440

[52] U.S. Cl. ............................................. 73/194 C
[51] Int. Cl. .............................................. G01f 1/00
[58] Field of Search 73/194 R, 194 A, 194 C, 194 E, 73/194 F

[56] References Cited
UNITED STATES PATENTS

| | | | |
|---|---|---|---|
| 3,473,377 | 10/1969 | Reinecke | 73/194 C |
| 3,595,078 | 7/1971 | Beck et al. | 73/194 F |
| 3,688,106 | 8/1972 | Brain | 73/194 F X |

Primary Examiner—Donald O. Woodiel
Assistant Examiner—John P. Beauchamp
Attorney, Agent, or Firm—Ernest D. Buff; Jonathan Plaut

[57] ABSTRACT

Apparatus for measuring the flow velocity of fluid within a conduit. Sensing means external to the conduit and responsive to changes in the configuration of the conduit surface upon passage of a vortex and associated with electrical means measure the time interval during which the detectable property of the fluid passes between a plurality of preselected locations on the conduit. Fluid flow is not obstructed by installation of the sensing means. Thus, flow measurements, at a plurality of locations along the conduit can be economically obtained.

10 Claims, 8 Drawing Figures

APPARATUS FOR MEASURING THE FLOW VELOCITY OF FLUID WITHIN A CONDUIT

BACKGROUND OF THE INVENTION

1. Field of the Invention

This invention relates to apparatus for measuring the velocity of fluid through a conduit and more particularly to sensing means external to the conduit and associated with electrical means for measuring the time interval during which a detectable property of the fluid passes between a plurality of preselected locations on the conduit.

2. Description of the Prior Art

One of the most troublesome problems of industrial instrumentation is the difficulty of economically measuring the velocity of fluid through a conduit. Apparatus which has been proposed by prior art workers for such velocity measurements includes a plurality of sensors fixedly mounted in the conduit wall for contact with the fluid, and electrical means associated with the sensors for timing the passage of a detectable property of the fluid therebetween. Such internal sensing apparatus tends to obstruct the flow and is not especially suitable for use in measuring the flow of fluids which are corrosive, poisonous or radioactive. Installation of the sensors is not easily effected without temporarily stopping flow within the conduit. Due to the fixed location of the sensors, flow measurements at a plurality of locations along the conduit cannot be economically obtained. For the above reasons, apparatus of the type described has generally resulted in higher costs for measuring fluid flow than have been considered desirable for commercial applications.

SUMMARY OF THE INVENTION

The present invention provides an economical apparatus wherein the velocity of a fluid within a conduit and having a Reynolds number sufficient to form vortices therein is measured by electrical means associated with a plurality of sensing means on the exterior surface of the conduit. The apparatus has a power source for supplying an electrical current. A first sensing means, adapted to be mounted on the exterior surface of the conduit and responsive to changes in the configuration of the exterior surface, transmits an electrical signal from the power source upon passage of a vortex thereby. A second sensing means, adapted to be mounted on the exterior surface of the conduit downstream of the first sensing means and responsive to changes in the configuration of the exterior surface, transmits an electrical signal from the power source upon passage of the vortex thereby. The first and second sensing means are respectively connected through a plurality of signal paths to electrical means for amplifying the electrical signals and for computing and indicating the flow velocity of the fluid.

The electrical means typically comprises amplification means for linearly reproducing the wave forms of the signals from the respective sensing means, and computation means for solving the equation $$f(u,v) = \frac{K}{T}\int_0^T u(t+\Delta t')v(t+\Delta t)dt$$

for a maximum of $f(u,v)$, where: $K$ is a scaling constant so chosen as to make the output signal compatible with the indicating recording and controlling mechanisms of the computation means, $T$ is the integrating time constant of the computation means, $u(t)$ is the output signal of the first sensing means, $v(t+\Delta t)$ is the output signal of the second sensing means, $\Delta t$ is the time interval for transit of the vortex between the first and second sensing means, hereinafter called the vortex transit time, and $\Delta t'$ is a function generated by the computer and is varied manually or automatically to enable detection and recognition of the maximum of $f(u,v)$. Computation of the fluid velocity may be carried out digitally by means of a digital computor or by analog computation means.

In operation of the apparatus, when fluid flowing within the conduit has a Reynolds number sufficient to form a vortex therein, as in the order of at least about 4,000, the vortex passes through the conduit at the average flow velocity of the fluid. The pressure exerted by the fluid at a given point on the interior surface of the conduit is momentarily decreased during passage of the vortex thereby. Such pressure decrease effects a corresponding change in the configuration of the exterior surface of the conduit, which configurational change proceeds down the conduit at substantially the same velocity as the vortex. Each of the first and second sensing means detects the configurational change and transmits an electrical signal from the power source to the electrical means upon passage of the vortex thereby. The electrical means amplifies the signals and computes the flow velocity of the fluid according to the equation described hereinabove.

In a specific embodiment, each of the sensing means is comprised of a strain gage of the metallic or semiconductor variety in series with an electrical power source and coupled to an amplification means through a capacitor, so that electrical signals resulting from dynamic variations of the strain gage are transmitted to the amplification means. The wave forms of the signals from the sensing means are linearly reproduced by the amplification means and transmitted to a computation means comprising (1) multiplication means for multiplying together the output signal of the second sensing means $v(t+\Delta t)$ with a timedelayed version of the output signal of the first sensing means $u(t)$, (2) control means for variably controlling the time interval $\Delta t'$ during which the signal from the first sensing means is delayed in transmission to the multiplication means, and (3) integration means for integrating the output of the multiplication means over a period of time T to give its mean value, hereinafter called the cross-correlation function. When the transit time interval ($\Delta t$) is equal to the time interval for transmission of the output signal from the sensor through the control means to the multiplication means, hereinafter called the controlled time interval $\Delta t'$, the cross-correlation function reaches a maximum. The controlled time interval $\Delta t'$ for the maximum value of the cross-correlation function uniquely defines the vortex transit time. An electrical signal having a magnitude equal to the controlled time interval $\Delta t'$ is transmitted to a simple analog or digital circuit which computes and records or indicates the flow velocity of the fluid. The velocity of the fluid is obtained by dividing the distance between the first and second sensing means by the vortex transit time.

The apparatus of this invention has advantageous structural features. Since the sensing means and the electrical means are each external to the conduit, fluid flow is not obstructed. Flow measurement of corrosive, poisonous or radioactive fluids is facilitated. The sensors can be installed without stopping flow within the conduit, and flow measurements from a plurality of locations can be economically obtained.

BRIEF DESCRIPTION OF THE DRAWINGS

The invention will be more fully understood and further advantages will become apparent when reference is made to the following detailed description of the preferred embodiments of the invention and the accompanying drawings in which.

DESCRIPTION OF THE PREFERRED EMBODIMENTS

Figure 1:
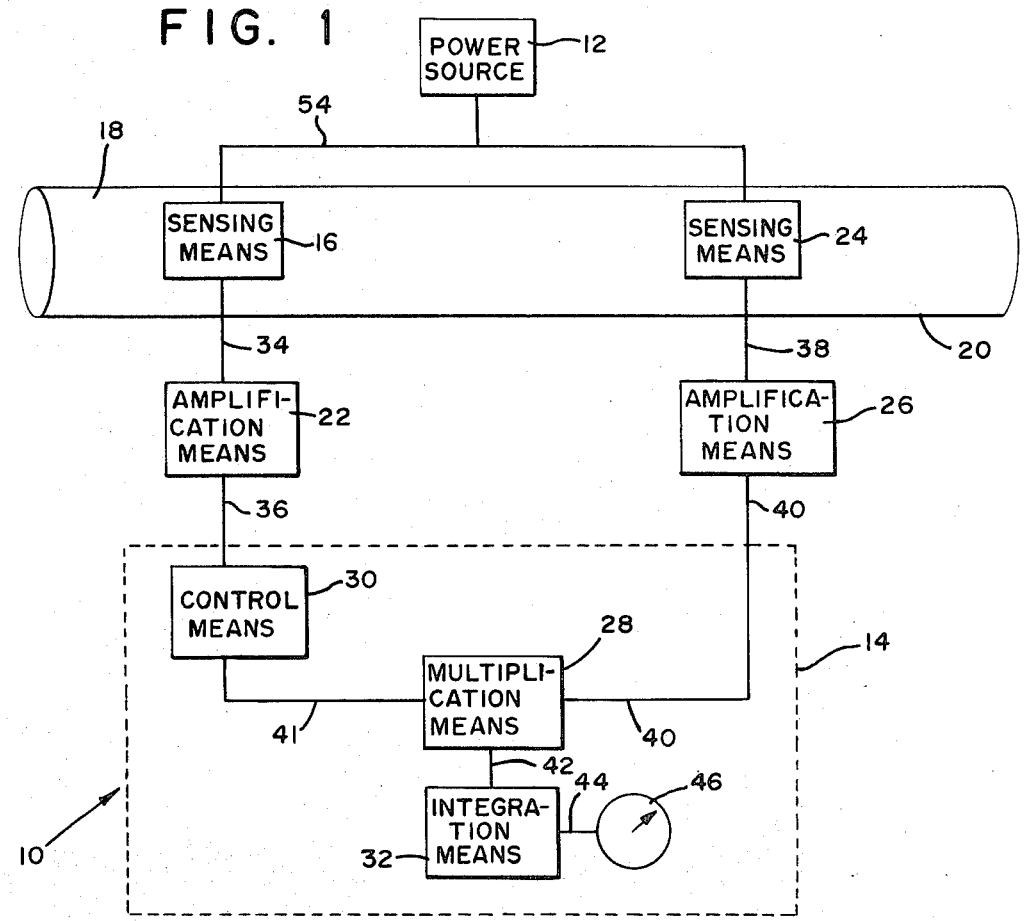
FIG. 1 is a diagrammatic representation of apparatus for measuring the flow velocity of fluid in a conduit.

The fluid transferring conduits with which the present invention can be used may be fabricated in a number of diverse sizes and configurations. As a consequence, the invention will be found to function with most varieties of such conduits. For illustrative purposes, the invention is described in connection with a substantially cylindrical conduit for transferring a fluid therewithin. As used in this paragraph and elsewhere in the specification and claims the term fluid includes compressible and noncompressible substances tending to conform to the outline of a container, such as homogeneous liquids, emulsions, slurries and suspensions, gases and gas solid mixtures, and granular or pulverized solids and the like.

Referring to the drawings, the apparatus, shown generally at 10, includes a power source 12 connected to a computation means 14 through two parallel signal paths, each path having a sensing means and in combination with the other path an electrical means, as described below. The first signal path includes a first sensing means 16 mounted on the exterior surface 18 of a cylindrical conduit 20 and connected through line 34, amplification means 22 and line 36 to the computation means 14. The second signal path includes a second sensing means 24 mounted on the exterior surface 18 of the conduit 20 downstream of the first sensing means 16 and connected through line 38, amplification means 26 and line 40 to the computation means 14. Each of the sensing means 16 and 24 is responsive to changes in the configuration of the exterior surface 18 of the conduit 20. When fluid flowing within the conduit has a Reynolds number sufficient to form vortices therein, as in the order of at least about 4,000, preferably at least about 10,000, the vortices pass through the conduit at the average flow velocity of the fluid. The pressure exerted by the fluid at a given point on the interior surface of the conduit is momentarily decreased during passage of a vortex thereby. Such pressure decrease effects a corresponding change in the configuration of the exterior surface of the conduit, which configurational change proceeds down the conduit at substantially the same velocity as the vortex. Each of the sensing means 16 and 24 transmits an electrical signal to its respective amplification means 22 and 26 upon passage of the vortex thereby. The wave forms of the signals from the sensing means 16 and 24 are amplified by amplification means 22 and 26, respectively. Upon exiting the amplification means 22 and 26 the signals from the sensing means 16 and 24 are respectively transmitted to the computation means 14, which is programmed to solve the above-noted equation:

$$f(u,v) = \frac{K}{T}\int_o^T u(t+\Delta t')v(t+\Delta t)dt$$

Computation of the fluid velocity may be carried out digitally by means of a digital computer (not shown) or by analog computation means as hereinafter described.

FIG. 1 illustrates a computation means of the analog variety. Other forms of the computation means can also be used. The computation means shown in FIG. 1 should therefore be interpreted as illustrative and not in a limiting sense. Such means may comprise a multiplication means 28 for multiplying together the output signal $v(t+\Delta t)$ of the second sensing means 24 with a time delayed version of the output signal $u(t)$ of the first sensing means 16, control means 30 for variably controlling the time $\Delta t'$ by which the signal from the first sensing means 16 is delayed in transmission to the multiplication means 28, and integration means 32 for integrating the output of the multiplication means 28 over a period of time $T$ to give the cross-correlation function.

Each of the amplification means 22 and 26 has a frequency response ranging from about 0.1 to 1,000 Hertz and a gain of sufficient magnitude to elevate the signal voltages from the sensing means 16 and 24 to a useful level, as in the order of about 1 to 20 volts. Generally speaking, a gain of from about $10^5$ to $10^7$ is sufficient for this purpose.

Figure 4:
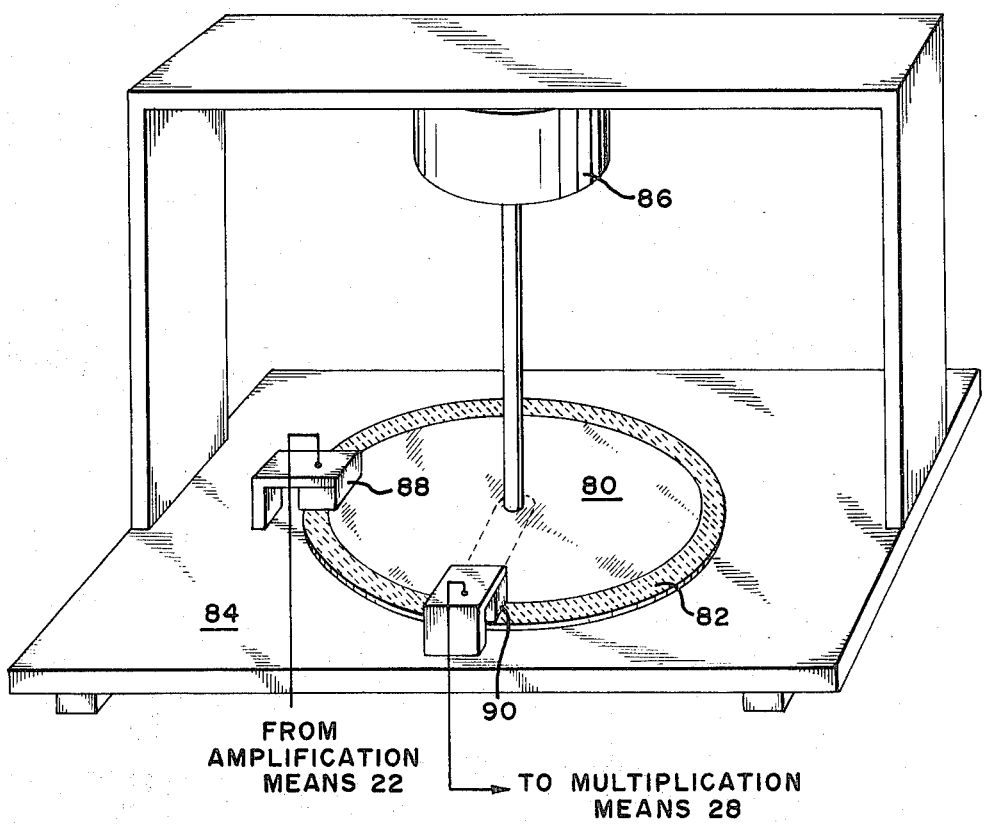
FIG. 4 is a perspective view of one embodiment of a control means.
Figure 5:
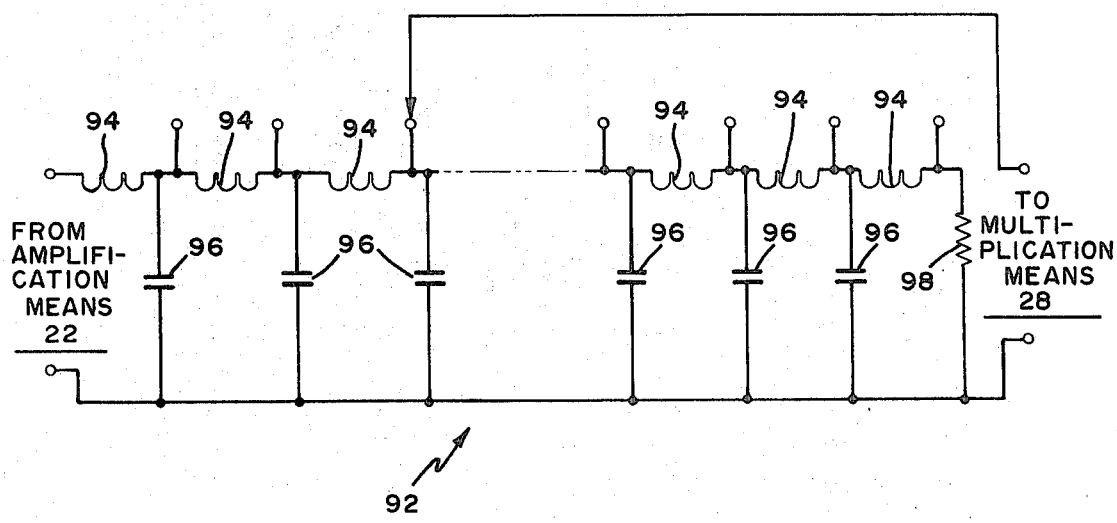
FIG. 5 is a schematic electrical diagram of another embodiment of the control means.

The methods and means for generating the controlled time interval $\Delta t'$ are numerous. For example, in one embodiment, shown in FIG. 4, the control means may be comprised of a substantially annular disc 80 having an outer peripheral surface 82 of magnetic material and mounted on a support 84 for rotation by motor 86 at a constant velocity. An amplified signal from amplification means 22 and line 36 is recorded on the disc 80 by a recording head 88 fixedly mounted on the support 84 adjacent the peripheral surface 82. The delayed signal is obtained from a pick-up head 90 movably mounted on the support adjacent the peripheral surface of the disc. By mechanically varying the peripheral separation of the recording and pick-up heads 88 and 90, respectively, the time interval during which the amplified signal from the first sensing means is delayed in transmission to the multiplication means can be variably controlled. In another embodiment, shown in FIG. 5, the control means may be comprised of a variably tapped delay line generally indicated at 92 composed of inductors 94 and capacitors 96 so arranged and terminated by resistor 98 as to constitute an artificial transmission line. These and other embodiments of the control means are intended to fall within the scope of the invention as defined by the subjected claims.

Figure 6:
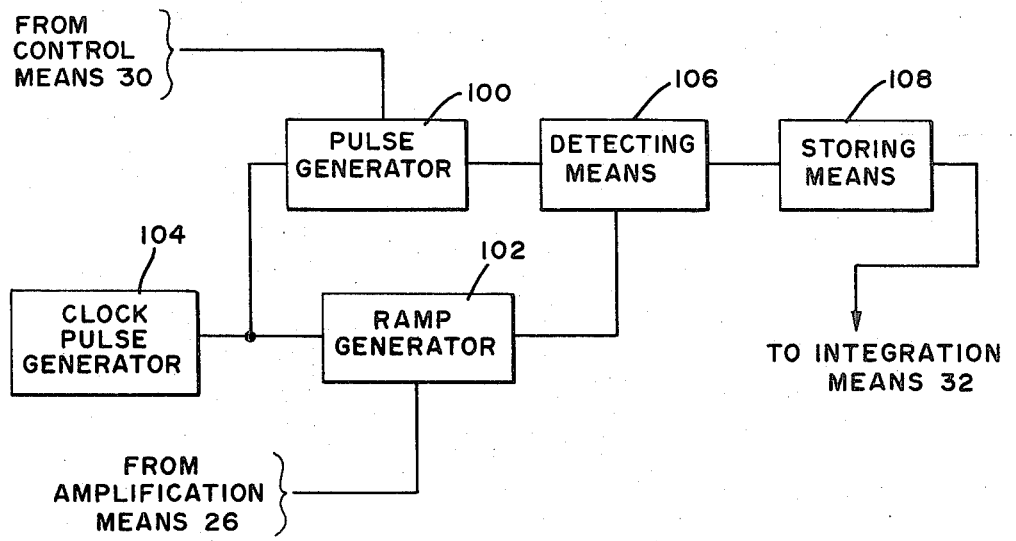
FIG. 6 is a diagrammatic representation of one form of a multiplification means.

The amplified signal $v(t+\Delta t)$ from the amplification means 26 and line 40 and the delayed signal $u(t+\Delta t')$ from the control means 30 and line 41 are multiplied together by the multiplication means 28. Such means may be of any suitable pattern such as, for example, a device making use of the Hall effect or a servo motor driven potentiometer. In still another embodiment, shown in FIG. 6, the multiplication means 28 can comprise a pulse generator 100 for providing a regularly recurring series of pulses having a high state and a low state. The time duration of the high state is varied in proportion to the magnitude of the signal $u(t+\Delta t')$ from the control means 30. A ramp function generator 102 is provided for generating a regularly recurring signal in the form of a series of ramps each having a magnitude which increases linearly with time. Each of the ramps is initiated concurrently with a pulse from pulse generator 100 by a clock pulse from clock pulse generator 104. The ramp terminates after a preselected time interval of at least the same duration as the time interval during which the pulse has a high state. The maximum magnitude of the ramp is equal to the magnitude of the signal $v(t+\Delta t)$ from the second sensing means 24 and amplification means 26. Detecting means 106 and storing means 108 are provided for detecting and storing the magnitude of the ramp signal at the instant at which the pulse returns to a low state. The stored signal, which is the product of the output signal $v(t+\Delta t)$ of the second sensing means 24 and the output signal $u(t+\Delta t')$ from the first sensing means 16 is transmitted through line 42 to the integration means 32.

The integration means 32 integrates the output of the multiplication means over a period of time to give the cross-correlation function. Such means may comprise a resistance/capacitance system such as an amplifier and capacitive feedback combination. The construction and operation of the integration means 32 is well understood by those skilled in the art. For this reason such means have been illustrated schematically.

When the transit time interval $\Delta t$ is equal to the controlled time interval $\Delta t'$, the cross-correlation function reaches a maximum. At this maximum, the controlled time interval $\Delta t'$ uniquely defines the maximum value of the vortex transit time. An electrical signal having a magnitude equal to the controlled time interval $\Delta t'$ is transmitted through line 44 to an analog circuit 46 which computes and records or otherwise indicates the flow velocity of the fluid. Such velocity is computed in accordance with the equation: $V = d/t$ where: $V$ is the fluid velocity, $d$ is the distance between the first sensing means 16 and the second sensing means 24 and $t$ is the vortex transit time.

Figure 2:
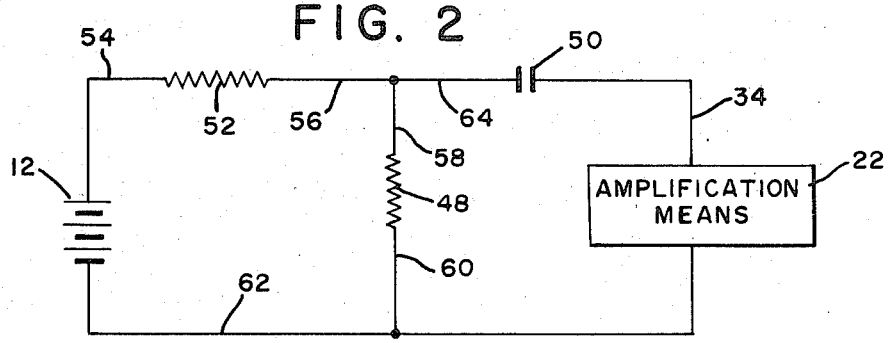
FIG. 2 is a schematic electrical diagram of the sensing means of FIG. 1 showing its connection to a source of electrical power and to amplication means.

In FIG. 2 there is shown schematically an electrical diagram of one form of the sensing means 16 and 24. Other forms of sensing means can also be used. Preferably, each of the sensing means is constructed in the same manner. Thus the sensing means 24 can be constructed in the same manner as the sensing means 16, which is described hereinafter in more detail. Such means may comprise a strain gage having a resistance element 48 of the metallic or semiconductor variety in series with the power source 12 and coupled to the amplification means 22 through a capacitor 50. The power source 12 may be a primary or a storage battery having an electrical potential of about 6 volts. A resistor 52 having a resistance of approximately 10 times the resistance element 48, as in the order of about 10,000 ohms is connected in series between the battery and the resistance element 48. The resistance element 48 has a resistance ranging from about 50 to 10,000 ohms, preferably from about 100 to 1,000 ohms. A constant electrical current from power source 12 and line 54 passes through the resistor 52, lines 56 and 58, the resistance element 48 and lines 60 and 62. Dynamic variations in the configurations of the exterior surface 18 of the conduit 20 change the resistance value of the resistance element 48. An electrical signal from line 64 and capacitor 50 is transmitted through line 34 to the amplification means 22. In this manner the dynamic variations of the strain gage resistance are impressed upon the input circuitry of the amplification means 22. The capacitor 50 has a capacitance of sufficient magnitude that the frequencies of the electrical signals within the range of interest of the amplification means 22 are transmitted substantially without distortion. Such range of interest is predetermined and comprises the voltage alternations expected to result from passage of the vortex. Thus the capacitance of the capacitor 50 is generally in the order of about 0.01 to 100 microfarads, preferably about 0.1 to 10 microfarads.

Figure 3:
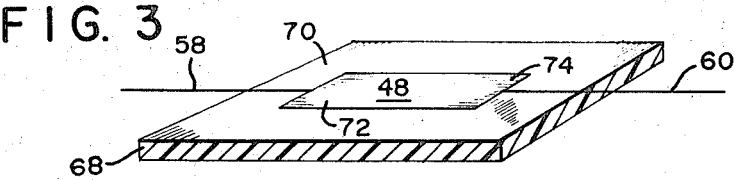
FIG. 3 is an isometric view of one form of a strain gage for use with the sensing means of FIG. 2.

In FIG. 3 there is shown one form of the strain gage. Other forms of such gage may also be used. The strain gage shown in FIG. 3 is intended to be illustrative and should not be interpreted to limit the scope of the invention to the particular structure disclosed. Such strain gage comprises at least one resistance element 48 of platinum, nickel, germanium, silicon or other suitable electrically resistive material permanently connected to a nonconductive support 68. The connection may be obtained by encapsulating the resistance element 48 within a matrix of epoxy-impregnated glass fibers or by rigidly bonding the resistance element 48 to the upper surface 70 of the support 68. Lead wire 58 is electrically connected to one end 72 of the element 48. The other end 74 of the element 48 is electrically connected to lead wire 60. The lower surface of the support is rigidly secured to the exterior surface 18 of the conduit 20 (shown in FIG. 1), by a suitable epoxy resin or the like.

The apparatus 10 which has been disclosed herein can be modified in numerous ways without departing from the scope of the invention.

Figure 7:
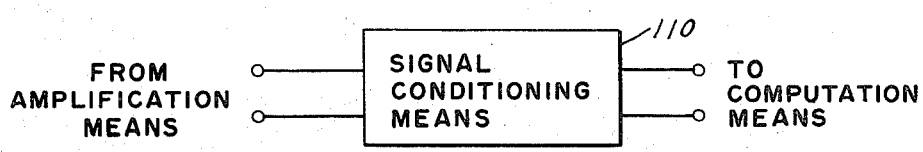
FIG. 7 is a diagrammatic representation of one form of a signal conditioning means.

Interfering signals imposed upon the first and second signal paths can be selectively filtered from the total signals of such paths by a signal conditioning means 110 which reduces the magnitude of the interfering signals. Such signal conditioning means can be connected in each of said signal paths (1) between the sensing means and the amplification means, (2) between the amplification means and the computation means, (3) at each of locations (1) and (2), or (4) within each of the amplification means. As shown in FIG. 7, the signal conditioning means 110 is connected in each of the first and second signal paths between the amplification means 22, 26 and the computation means 14. The type of signal conditioning means selected and its particular location within the electrical means depends upon the amount and nature of the interfereing signals to be filtered. For example, the magnitude of interfering signals impressed upon the output of the amplification means by commercial power installations can be effectively reduced by a band-stop filter connected in each of said signal paths between the amplification means and the computation means and centered on the commercial power frequency, typically 60 Hertz. Other types of signal conditioning means, such as a high-pass filter, a low-pass filter, a band-pass filter, or any combination thereof, can be used to reduce such interfering signals. The construction and operation of such signal conditioning means, as well as the selection of a particular type thereof, is well understood by those skilled in the art.

Figure 8:
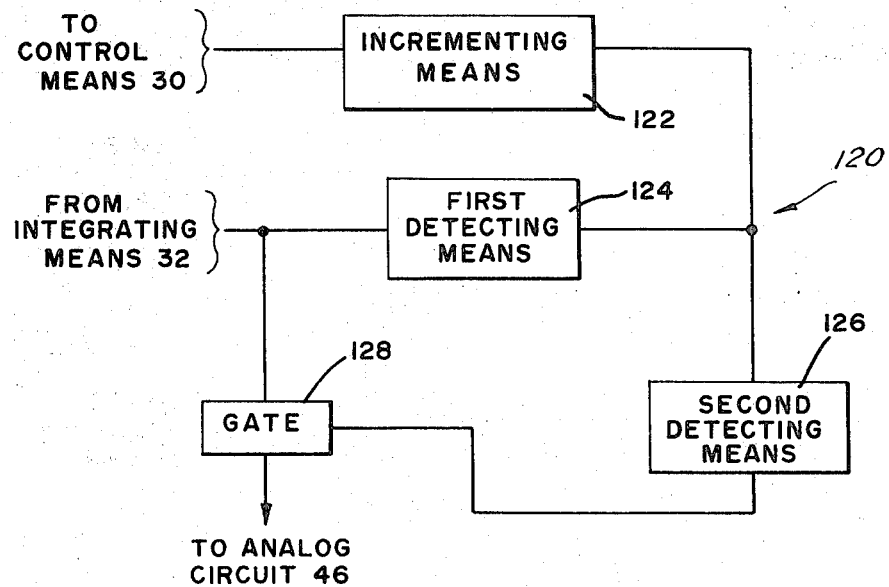
FIG. 8 is a diagrammatic representation of one form of a maximum seeking circuit.

As mentioned hereinabove, computation of the fluid velocity may be carried out by a digital computer. Moreover, as shown in FIG. 8 the time control means 20 can include a maximum seeking circuit 120 for automatically adjusting the controlled time interval $\Delta t'$. The maximum seeking circuit is preferably in the form of a "hill climbing" controller of the perturbation or other suitable variety having (1) incrementing means 122 adapted to alter the controlled time interval $\Delta t'$ by a predetermined increment of time, (2) first detecting means 124 for detecting whether the output signal of the integration means 32 has increased or decreased and causing the incrementing means 122 to alter the succeeding controlled time interval $\Delta t'$ by the predetermined increment of time so as to increase the integration output and (3) second detecting means 126 for causing gate 128 to transmit a signal from integrating means 32 to analogue circuit 46 when successive alterations made by the incrementing means 122 have alternating directions. These and other modifications are intended to fall within the scope of the invention as defined by the subjoined claims.

In operation, a change in the configuration of the exterior surface 18 of the conduit 20 induced by a vortex of the fluid therein momentarily alters the length and, hence, the resistance value of the resistance element 48 of the first sensing means 16. An electrical signal $u(t)$ from line 64 and capacitor 50 is transmitted through line 34 to the amplification means 22. The amplified wave form of the signal $u(t)$ is transmitted through line 36 to the control means 30 which variably controls the time $\Delta t'$ by which the signal $u(t)$ is delayed in transmission to the multiplication means 28. When configurational changes induced by the vortex (not shown) are sensed by the second sensing means 24, an electrical signal $v(t)$ is transmitted through line 38 to the amplification means 26. The amplified wave form of the signal $v(t+\Delta t)$ is transmitted through lines 40 and 38 to the multiplication means 28. The output signal $u(t+\Delta t')$ from the control means 30 and the output signal $v(i t+\Delta t)$ from the amplification means are multiplied together by the multiplication means 28. The output signal from the multiplication means 28 is transmitted through line 42 to the integration means 32 which integrates the signal over a period of time $T$ to give the cross-correlation function. When the transit time interval is equal to the controlled time interval $\Delta t'$, the cross-correlation function reaches a maximum. The controlled time interval $\Delta t'$ uniquely defines the maximum value of the vortex transit time, and an electrical signal having a magnitude equal to the controlled time interval $\Delta t'$ is transmitted through line 44 to an analog circuit 46. The latter computes and records or otherwise indicates the flow velocity of the fluid according to the above noted equation $V = d/t$.

Having thus described the invention in rather full detail it will be understood that these details need not be strictly adhered to but that various changes and modifications may suggest themselves to one skilled in the art. It is accordingly intended that all matter contained in the above description and shown in the accompanying drawings shall be interpreted as illustrative and not in a limiting sense.

I claim:

1. Apparatus for measuring the velocity of fluid within a conduit, said fluid having a Reynolds number sufficient to form vortices therein, comprising:
   a. a power source for supplying an electrical current;
   b. first sensing means, adapted to be mounted on the exterior surface of said conduit and responsive to changes in the configuration of said exterior surface, for transmitting an electrical signal from the power source upon passage of a vortex thereby;
   c. second sensing means, adapted to be mounted on the exterior surface of said conduit downstream of said first sensing means and responsive to changes in the configuration of said exterior surface, for transmitting an electrical signal from the power source upon passage of the vortex thereby;
   d. said first and second sensing means respectively connected through a plurality of signal paths to electrical means for amplifying the electrical signals and for computing and indicating the flow velocity of the fluid.

2. Apparatus as recited in claim 1, wherein each of the sensing means comprises a strain gage having a resistance element in series with said power source and electrically connected to said amplification means through a capacitor.

3. Apparatus as recited in claim 2, wherein said electrical means includes amplification means for linear reproduction of said signals, multiplication means for multiplying together the signal from said second sensing means and the signal from said first sensing means, control means for variably controlling the time interval during which the signal from said first sensing means is delayed in transmission to said multiplication means, and integration means for integrating the output of said multiplication means over a period of time to give the cross-correlation function of the equation $$f(u,v) = \frac{K}{T} \int_0^T u(t+\Delta t')v(t+\Delta t)dt$$

where $K$ is a scaling constant, $T$ is an integration time constant, $u(t)$ is the output signal of said first sensing means, $\Delta t$ is the time interval for transit of said vortex between said first and second sensing means, and $\Delta t'$ is the cross-correlation function.

4. Apparatus as recited in claim 3 wherein said electrical means additionally includes analog circuit means coupled to the integration means for computing and indicating the flow velocity of the fluid according to the formula $V = d/t$ where $V$ is the fluid velocity, $d$ is the distance between said first and second sensing means and t is the time interval for transit of the vortex between said first and second sensing means.

5. Apparatus as recited in claim 4 wherein said electrical means additionally includes signal conditioning means connected in each of the signal paths between each of said first and second sensing means and said computation means for reducing the magnitude of interfering signals imposed upon such paths.

6. Apparatus as recited in claim 4, wherein said amplification means has a frequency response ranging from about 0.1 to 1,000 Hertz and a gain in the order of about $10^5$ to $10^7$.

7. Apparatus as recited in claim 6 wherein said control means comprises a substantially annular disc having an outer peripheral surface of magnetic material and mounted on a support for rotation at a constant velocity, a recording head fixedly mounted on said support adjacent said peripheral surface and electrically connected through amplification means to the output of said first sensing means for recording an amplified signal of said first sensing means on said disc, a pick-up head movably mounted on said support adjacent said peripheral surface of said disc and electrically connected to said multiplication means, and means for varying the peripheral separation of said recording and pick-up heads.

8. Apparatus as recited in claim 7, wherein said means for varying said peripheral separation of said recording and pickup heads includes a maximum seeking circuit, whereby the time interval during which the signal from said first sensing means is delayed in transmission to said multiplication means is automatically controlled.

9. Apparatus as recited in claim 6, wherein said control means includes a tapped delay line so arranged and terminated as to constitute an artificial transmission line.

10. Apparatus as recited in claim 8, wherein said multiplication means comprises a pulse generator for providing a regularly recurring series of pulses having a high state and a low state, means for varying the time duration of said high state of each pulse in proportion to the magnitude of the signal from said control means, a ramp function generator for generating a regularly recurring signal in the form of a series of ramps, each of said ramps being initiated concurrently with a pulse and terminating after a preselected time interval of at least the same duration as the time interval during which said pulse has a high state, the magnitude of each of said ramps increasing linearly with time to a maximum equal to the magnitude of the signal from said second sensing means.

* * * * *